(12) United States Patent
Wang et al.

(10) Patent No.: US 7,735,908 B2
(45) Date of Patent: *Jun. 15, 2010

(54) VEHICLE HOOD WITH SANDWICH INNER STRUCTURE

(75) Inventors: Jenne-Tai Wang, Rochester, MI (US);
Bing Deng, Rochester Hills, MI (US);
Qing Zhou, Beijing (CN); Qi Liu,
Beijing (CN); Yong Xia, Beijing (CN)

(73) Assignee: GM Global Technology Operations, Inc., Detroit, MI (US)

( * ) Notice: Subject to any disclaimer, the term of this patent is extended or adjusted under 35 U.S.C. 154(b) by 320 days.

This patent is subject to a terminal disclaimer.

(21) Appl. No.: 11/782,258

(22) Filed: Jul. 24, 2007

(65) Prior Publication Data

US 2009/0025995 A1   Jan. 29, 2009

(51) Int. Cl.
*B62D 25/10* (2006.01)

(52) U.S. Cl. .............................. 296/193.11; 52/783.17; 52/783.19; 180/69.2

(58) Field of Classification Search ............. 52/783.14, 52/783.17, 783.19; 180/69.2, 69.21; 296/187.04, 296/187.09, 191, 193.09, 193.11, 203.02; 428/182

See application file for complete search history.

(56) References Cited

U.S. PATENT DOCUMENTS

| | | | | |
|---|---|---|---|---|
| 1,925,453 A | * | 9/1933 | Mazer | 181/290 |
| 3,094,350 A | * | 6/1963 | Cusick | 296/97.23 |
| 3,674,620 A | * | 7/1972 | McCarthy et al. | 428/114 |
| 4,035,539 A | * | 7/1977 | Luboshez | 428/178 |
| 4,097,958 A | * | 7/1978 | Van Dell | 16/225 |
| 4,136,630 A | * | 1/1979 | Fraser | 114/102.27 |
| 4,886,696 A | * | 12/1989 | Bainbridge | 428/184 |
| 4,950,522 A | | 8/1990 | Vogt et al. | |
| 5,048,877 A | | 9/1991 | Rogers, Jr. et al. | |
| 5,182,158 A | * | 1/1993 | Schaeffer | 428/178 |
| 5,290,622 A | * | 3/1994 | Tanabe | 428/182 |
| 5,682,667 A | * | 11/1997 | Flagg | 29/460 |
| 5,791,118 A | * | 8/1998 | Jordan | 52/783.11 |

(Continued)

FOREIGN PATENT DOCUMENTS

GB   2186235 A   *   8/1987

(Continued)

OTHER PUBLICATIONS

Koki Ikeda et al., Development of Aluminum Hood Structure for Pedestrian Protection, Oct. 29, 2003.

*Primary Examiner*—Glenn Dayoan
*Assistant Examiner*—Paul A Chenevert (57) ABSTRACT

An energy-absorbing hood assembly for a vehicle includes upper and lower layers and a middle panel. The upper and lower layers have first and second interface surfaces, respectively. The middle panel has opposing first and second surfaces defining a corrugated profile having a plurality of bonding surfaces, the bonding surfaces being attached to the first and second interface surfaces to thereby define a plurality of laterally oriented channels. The corrugated profile further defines a height and wavelength along a substantial portion of the hood assembly, each being configured to be variably tunable to provide different predetermined levels of absorption and attenuation of kinetic energy imparted to the hood assembly by objects upon impact therebetween. Preferably, the hood assembly also includes an upper hood panel having an inner surface secured to the upper layer. Ideally, the corrugated profile is a trapezoidal waveform profile.

32 Claims, 5 Drawing Sheets

U.S. PATENT DOCUMENTS

| | | |
|---|---|---|
| 5,967,573 A | 10/1999 | Wang |
| 6,179,364 B1 * | 1/2001 | Takahashi .................... 296/76 |
| 6,290,272 B1 * | 9/2001 | Braun ........................ 293/120 |
| 6,302,458 B1 | 10/2001 | Wang et al. |
| 6,401,565 B1 | 6/2002 | Wang et al. |
| 6,415,882 B1 | 7/2002 | Schuster et al. |
| 6,439,330 B1 | 8/2002 | Paye |
| 6,513,617 B2 | 2/2003 | Sasaki et al. |
| 6,641,166 B2 | 11/2003 | Browne et al. |
| 6,813,562 B2 | 11/2004 | Altan et al. |
| 6,883,627 B1 | 4/2005 | Staines et al. |
| 6,939,599 B2 * | 9/2005 | Clark ........................ 428/178 |
| 7,055,894 B2 | 6/2006 | Ikeda et al. |
| 7,090,289 B2 | 8/2006 | Koura |
| 7,114,765 B2 | 10/2006 | Ishikawa et al. |
| 7,140,673 B2 | 11/2006 | Ito et al. |
| 7,150,496 B2 | 12/2006 | Fujimoto |
| 7,399,028 B1 * | 7/2008 | Castillo et al. ......... 296/193.11 |
| 7,467,680 B2 * | 12/2008 | Mason ...................... 180/69.2 |
| 7,488,031 B2 * | 2/2009 | Ishitobi ................. 296/193.11 |
| 7,497,507 B2 * | 3/2009 | Matsushima et al. ... 296/193.11 |
| 7,635,157 B2 * | 12/2009 | Wang et al. ............ 296/193.11 |
| 2002/0003054 A1 * | 1/2002 | Kamada et al. ............ 180/69.2 |
| 2002/0189195 A1 * | 12/2002 | McKague et al. ........ 52/783.19 |
| 2003/0121710 A1 * | 7/2003 | Hamada et al. ............. 180/274 |
| 2005/0001453 A1 * | 1/2005 | Endo et al. ............. 296/193.11 |
| 2005/0023059 A1 * | 2/2005 | Kamada et al. .......... 180/69.21 |
| 2005/0057076 A1 * | 3/2005 | Roux et al. .................. 296/198 |
| 2006/0163915 A1 | 7/2006 | Ikeda et al. |
| 2006/0202492 A1 | 9/2006 | Barvosa-Carter et al. |
| 2006/0220418 A1 | 10/2006 | Behr et al. |
| 2007/0063544 A1 * | 3/2007 | Browne et al. ......... 296/187.09 |
| 2007/0132279 A1 * | 6/2007 | Donabedian et al. ... 296/193.11 |
| 2008/0088154 A1 * | 4/2008 | Rocheblave et al. ... 296/187.04 |
| 2008/0122261 A1 * | 5/2008 | Seo ........................ 296/193.11 |
| 2008/0191518 A1 * | 8/2008 | Maruyama et al. ...... 296/203.02 |
| 2008/0315626 A1 * | 12/2008 | Lutter et al. ........... 296/187.04 |
| 2009/0026807 A1 * | 1/2009 | Wang et al. ............. 296/193.11 |
| 2009/0065277 A1 * | 3/2009 | Wang et al. ................. 180/69.2 |
| 2010/0019540 A1 * | 1/2010 | Fujimoto ................ 296/193.11 |

FOREIGN PATENT DOCUMENTS

| | | | |
|---|---|---|---|
| JP | 54028373 A | * | 3/1979 |
| JP | 59156872 A | * | 9/1984 |
| JP | 61150824 A | * | 7/1986 |
| JP | 62026170 A | * | 2/1987 |
| JP | 62085767 A | * | 4/1987 |
| JP | 02208174 A | * | 8/1990 |
| JP | 03054079 A | * | 3/1991 |
| JP | 05278637 A | * | 10/1993 |
| JP | 2004-136810 A | | 5/2004 |

* cited by examiner

VEHICLE HOOD WITH SANDWICH INNER STRUCTURE

TECHNICAL FIELD

The present invention relates generally to vehicle front structures, and more particularly to energy-absorbing engine compartment hoods for reducing force and acceleration transmitted to an object by the engine compartment hood upon impact therebetween, while minimizing the stopping distance of the object.

BACKGROUND OF THE INVENTION

Automotive vehicle bodies are typically constructed using stamped metal panels, which combine substantial overall strength and stiffness with a smooth, paintable exterior surface. With specific regard to vehicle hood panels (also referred to in the art as engine compartment hoods or bonnet structures), panel stiffness is often satisfied via the combination of a relatively high strength stamped metal outer or upper surface, referred to as an "A-surface", coupled with a preformed inner or lower surface, referred to as a "B-surface", supported by a series of engine-side or hat-section reinforcements. The hat-section reinforcements are typically positioned between the A- and B-surfaces of the hood, and include a pair of upper flanges oriented toward the A-surface as well as a single lower flange oriented toward the B-surface, with the upper and lower flanges interconnected by a web portion. This conventional hood construction increases the bending stiffness of the hood by placing relatively stiff material, usually stamped steel, as far away as possible from the neutral axis of bending of the hood.

In certain vehicle impact scenarios, an object may exert a downward force on the vehicle hood. Typically, vehicle hoods are deformable when a downward force is exerted thereto. However, the deformability of the hood and, correspondingly, the hood's ability to absorb energy may be impeded by the proximity of the hood to rigidly mounted components housed in the vehicle's engine (or forward) compartment. By way of example, the hood's ability to absorb energy through deformation can be significantly impeded where the hood and engine block are in close proximity. However, minimal clearance between the vehicle hood and the engine compartment components may provide significant benefits, such as improved driver visibility, increased aerodynamics, and aesthetic appeal.

In contrast, additional clearance between the vehicle hood and engine compartment can increase the hood's ability to absorb energy when acted upon with a downward force. Therefore, notwithstanding other design concerns, it can also be advantageous to increase the clearance between a vehicle hood and engine compartment components in the frontward and rearward areas of the vehicle hood.

SUMMARY OF THE INVENTION

An energy-absorbing hood assembly for a motorized vehicle is provided having a sandwich inner structure. The hood assembly described below offers a relatively high bending stiffness, and a relatively low and uniform crush stiffness. The high bending stiffness enables the vehicle hood to remain relatively rigid and stable when the hood is closed and the vehicle is in normal operation, rendering the hood resistant to flutter or shake dynamics that may occur at high vehicle speeds, and sufficiently resilient to meet "palm load" requirements. The low and uniform crush stiffness of the hood in turn ensures a compliant surface when the hood is subjected to a crush load upon impact with foreign objects. The present design maximizes the hood assembly's ability to absorb and attenuate kinetic energy imparted thereto, while minimizing the clearance between the hood assembly and the components housed in the engine compartment The vehicle hood assembly includes an upper layer, a lower layer, and a middle panel. The upper layer has a first interface surface, whereas the lower layer has a second interface surface. The middle panel has substantially opposing first and second surfaces defining a corrugated profile having a first and a second plurality of bonding surfaces. The first and second pluralities of bonding surfaces are each attached, secured, or mounted to a respective interface surface to thereby define a plurality of channels oriented laterally with respect to the vehicle.

In one aspect of the invention, the corrugated profile preferably defines a first height and a first wavelength along a first region of the hood assembly. The first height and wavelength are each configured to provide a first predetermined level of absorption and attenuation of kinetic energy imparted to the hood assembly by objects upon impact therebetween. To this regard, the wavelength is preferably between 40 to 165 millimeters. In addition, the height is preferably between 5 to 20 millimeters In another aspect of the invention, the corrugated profile further defines a second height and a second wavelength along a second region of the hood assembly, wherein the second region is different from the first region. The second height and wavelength are each configured to provide a second predetermined level of absorption and attenuation of kinetic energy imparted to the hood assembly by objects upon impact therebetween. In this instance, the first height is preferably 5 mm, the second height is preferably 10 mm, the first wavelength is preferably 40 mm, and the second wavelength is preferably 80 mm.

In yet another aspect of the invention, the corrugated profile also defines a variable height and a variable wavelength along a third region of the hood assembly, forming a transition region between the first and second regions. Ideally, the variable height and wavelength are configured to gradually transition from the relatively smaller height and wavelength of the first region to the larger height and wavelength of the second region, as well as to provide varying predetermined levels of absorption and attenuation of kinetic energy imparted to the hood assembly by objects upon impact therebetween throughout the third region.

The corrugated profile can take on various geometric configurations, including, but not limited to, a trapezoidal waveform profile, a triangular waveform profile, a combination trapezoidal-triangular waveform profile, a repeating half-spade profile, a bifurcate profile, or a trifurcate profile. In addition, the hood assembly can include a second lower layer attached, secured, or mounted to a second middle panel to thereby form a multi-layer composite sandwich inner structure, each layer having one or a combination of the aforementioned geometric configurations.

According to yet another aspect of the invention, a hood assembly is provided for use with a vehicle having a vehicle body defining a front compartment. The hood assembly is configured to extend over and above the front compartment of the vehicle. The hood assembly includes an upper layer, a lower layer, and a middle panel. The middle panel has substantially opposing first and second surfaces defining a corrugated profile having a first and a second plurality of bonding surfaces. The first and second pluralities of bonding surfaces are each attached, secured, or mounted to a respective interface surface to thereby define a plurality of channels oriented laterally with respect to the vehicle. The corrugated profile defines a first height and first wavelength along a first region of the hood assembly. In a similar regard, the corrugated profile also defines a second height and second wavelength along a second region of the hood assembly that is different from the first region. The first and second heights and first and second wavelength are each configured to provide different predetermined levels of absorption and attenuation of kinetic energy imparted to the hood assembly by objects upon impact therebetween.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
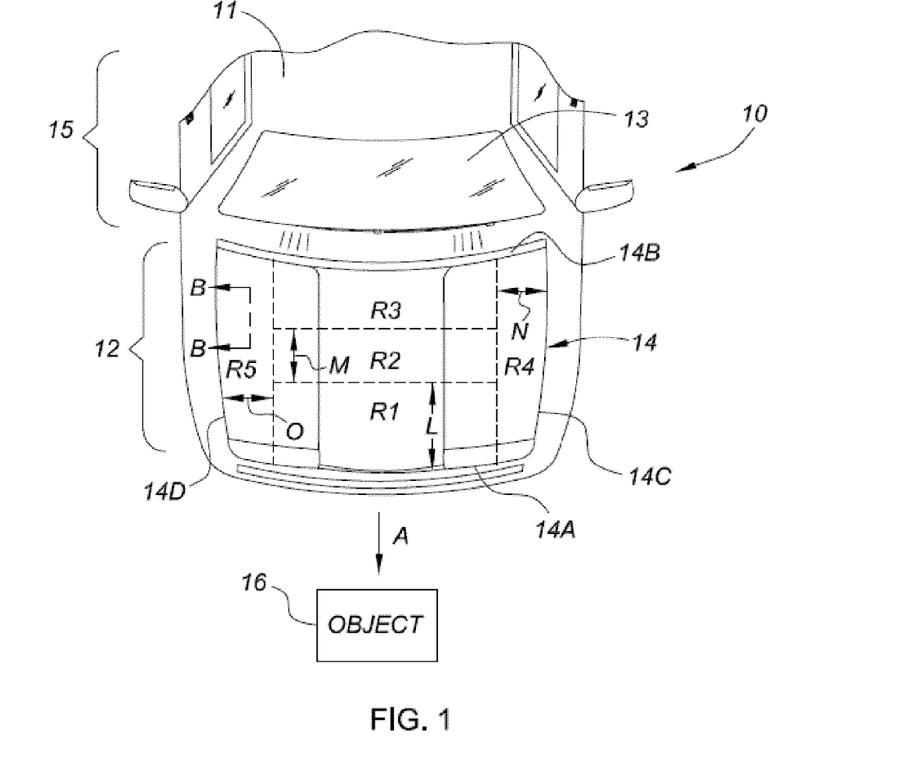
FIG. 1 is a plan perspective view showing an exemplary motor vehicle having mounted thereto an energy-absorbing hood assembly with a sandwich inner structure according to the present invention.

Referring to the Figures, wherein like reference numbers refer to the same or similar components throughout the several views, FIG. 1 is a plan view of an exemplary motor vehicle, identified generally as 10, having a vehicle body 11 that includes a moveable or actuatable energy-absorbing vehicle hood assembly (hereinafter "hood assembly 14") spanning or covering an engine compartment 12 forward of a passenger compartment 15. Although the vehicle 10 is depicted in FIG. 1 as a standard coupe-type passenger car, the hood assembly 14 can be incorporated into any vehicle platform (e.g., sedan-type passenger cars, light trucks, heavy duty vehicles, etc.)

The hood assembly 14 is operatively attached to the vehicle body 11, for example, by one or more peripheral hinges (not shown) positioned adjacently to a windshield 13. The hood assembly 14 is sufficiently sized and shaped to provide a closure panel suitable for substantially covering and protecting an engine 35 (see FIG. 2) and other various vehicular components, including, but not limited to, steering system, braking system, and heating, ventilation, and air conditioning (HVAC) system components (not shown), contained within the engine compartment 12. The term "engine" or "engine compartment" is not considered limiting with respect to the nature or type of propulsion system employed by the vehicle 10. Thus, within the scope of the claimed invention, the vehicle 10 may employ any propulsion system, such as a conventional internal combustion engine, an electric motor, a fuel cell, a hybrid-electric system, etc. As represented in FIG. 1, vehicle 10 may move or travel in the direction of arrow A toward an object 16, positioned external to vehicle 10, in such a manner that the object 16 impacts the hood assembly 14 in a substantially downward direction during a collision therebetween, thereby subjecting the hood assembly 14 to various stresses, forces, and/or loads, as described hereinbelow with reference to FIGS. 3 and 4.

Figure 2:
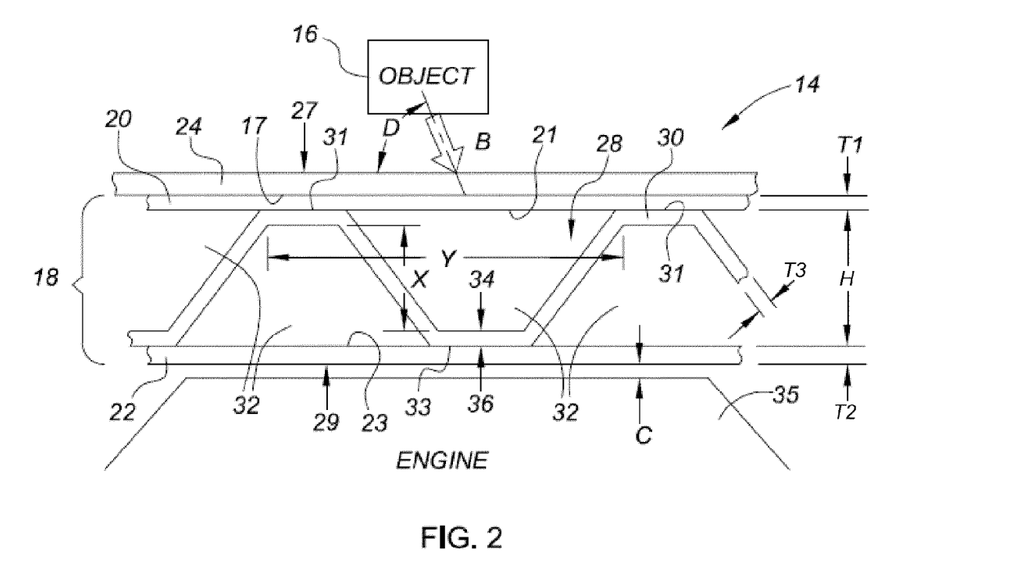
FIG. 2 is a side-schematic view taken along line B-B of the energy-absorbing hood assembly of FIG. 1 in accordance with a preferred embodiment of the present invention.

Turning to FIG. 2, a representative side view of the hood assembly 14, taken along line B-B of FIG. 1, is provided to illustrate the inner sandwich structure 18 according to a preferred embodiment of the present invention. The sandwich structure 18 consists of three primary elements—an upper layer or outer skin 20, a lower layer or inner skin 22, and a rippled core layer 28 therebetween. The lower layer 22, intended as the inner-most member, includes an engine-side surface or "B-surface" 29. The upper layer 20 is attached, secured, or adhered to an inner surface 17 of a hood outer panel 24, e.g. by adhesive, fastening, or welding. The hood outer panel 24 also includes an outermost, customer-visible "A-surface" 27. Alternatively, the hood outer panel 24 and upper layer 20 can be a single, unitary member.

The inner sandwich structure 18 preferably extends so as to cover substantially the entire inner surface 17 of the hood outer panel 24. On the other hand, the sandwich structure 18 can be fabricated and secured in such a manner so as to cover only certain portions of the inner surface 17 of the hood outer panel 24.

The sandwich structure 18 may be fabricated entirely from metal, entirely from plastic, or a combination thereof. For example, the upper and lower layers 20, 22 may be fabricated from a brittle plastic, such as Polymethyl methacrylate (PMMA) or bulk mold compound (BMC), of approximately 0.3 to 2.8 millimeters in thickness T1, T2, respectively. Alternatively, the upper and lower layers 20, 22 may be fabricated from metal plates, such as cold rolled steel, hot dipped galvanized steel, stainless steel, aluminum, and the like, of approximately 0.3 to 1.5 millimeters in thickness T1, T2. However, other values for the thicknesses T1, T2 for either or both of the upper and lower layers 20, 22 may be usable within the scope of the present invention.

Ideally, the upper and lower layers 20, 22 are one-piece plate members preferably preformed using such methods as stamping, hydroforming, quick plastic forming, or superplastic forming. It is further preferred that the upper and lower layers 20, 22 be individually contoured—e.g., the upper layer 20 is preformed with contours for aesthetic appeal and/or for improved bonding to the inner surface 17 of the hood outer panel 24, while the lower layer 22 is preformed with differing geometric parameters for positioning at different locations. In the alternative, it is also within the scope of the claimed invention that the upper and lower layers 20, 22 each consists of multiple plate members, include rounded or beveled edges and corners, have varying geometric configurations, and/or have complementary profiles.

Referring still to FIG. 2, the core layer 28 consists of a middle panel 30 having substantially opposing first and second surfaces 34, 36, respectively, that define a corrugated profile having a plurality of first and second bonding surfaces 31 and 33, respectively. As will be described in further detail below, the middle panel 30 is secured via the first bonding surface 31 to a first interface surface 21 of the upper layer 20 and via the second bonding surface 33 to a second interface surface 23 of the lower layer 22, preferably by an adhesive (e.g., adhesives 812, 912, 1012 of FIGS. 5A-5C, respectively) forming a plurality of channels 32, oriented laterally (i.e., orthogonally) relative to the vehicle body 11. Alternatively, the entire sandwich inner structure 18 (i.e., upper 20, lower 22 and middle 30 layers) can be manufactured by extrusion or other molding method in mass production, thereby eliminating the need for the first and second bonding surfaces 31, 32 and first and second interface surfaces 21, 23. See e.g., FIGS. 4A and 4B.

Ideally, the middle panel 30 is a one-piece plate member of the same length and width as the upper and lower layers 20, 22, preferably preformed using such methods as stamping, hydroforming, quick plastic forming, or superplastic forming. It is further preferred that the middle panel 30 is fabricated from a material known to have a suitable strength for the intended use of the hood assembly 14. For example, the middle panel 30 may be fabricated from a plastic polymer (e.g., PMMA or BMC), of approximately 1.1 to 1.9 millimeters in thickness T3, or metal (e.g., cold rolled steel, hot dipped galvanized steel, stainless steel, aluminum, and the like), of approximately 0.5 to 1.9 millimeters in thickness T3. The middle panel 30 may be finished with an anti-corrosive, highly durable coating (e.g., zinc plating.) It is also within the scope of the present invention that the middle panel 30 consists of multiple panel members, each taking on similar or distinct geometric profiles, as will be described in further detail below, and include rounded or beveled edges and corners. A compressible, energy-absorbing foam material (not shown), such as polyurethane foam, polystyrene foam, and/or other similar materials or combination of such materials, may be utilized to fill the channels 32.

According to the embodiment of FIG. 2, the first and second surfaces 34, 36 of the middle panel 30 define a trapezoidal waveform profile. As used herein, the term "waveform" should be defined or interpreted to mean a repeating, propagating geometric shape having a plurality of peaks and valleys, having a height X and a wavelength Y. The height X is a metric representing the vertical distance from the first surface 34 of a valley to the second surface 36 in a preceding or subsequent peak in a single propagation of the trapezoidal waveform profile. The wavelength Y, as shown in FIG. 2, is the distance between repeating units of the waveform cross-section.

The characteristics of the sandwich inner structure 18, namely the thickness T3, height X, wavelength Y, modulus, yield strength, and density, may be selected to provide a particular "tunable" and substantially constant or uniform crush performance for a given threshold crush load. More specifically, as the object 16 impacts the A-surface 27 of the hood outer panel 24, the actual and relative mass, velocity, and acceleration of object 16 and vehicle 10 (see FIG. 1) combine to generate a crush load (represented generally by arrow B) in a downward direction, e.g., at an angle D (see FIG. 2.) The crush load B therefore is directed from the upper layer 20 toward the lower layer 22, and has a specific magnitude. Each of the respective upper and lower layers 20 and 22 may be engineered, by virtue of their various geometries, to have relatively high tensile and compressive strength or stiffness to provide a preferred performance, while still maintaining a relatively low failure or threshold crush strength permitting a particular failure response or "crush performance" when the hood assembly 14 is subjected to crush load B, i.e. when the crush load B exceeds the threshold crush strength of upper layer 20. Ideally, the threshold crush strength is set at a level sufficient to permit contact with various small stones, hail, minor debris, or other such representative objects commonly encountered during ordinary roadway operation, to enable the hood assembly 14 to be utilized in a wide range of driving conditions without fracturing or failing.

According to the embodiment of FIGS. 1 and 2, the hood assembly 14 is broken up into as few as two, but preferably five regions R1-R5, respectively. The first R1, second R2, and third R3 regions dissect the hood assembly 14 into a forward region, a middle region, and a rearward region, respectively. In other words, the first region R1 extends from a forward edge 14A of the hood assembly 14 to a distance L extending rearward along the vehicle body 11. In addition, the second region R2 extends from the distance L rearward along the vehicle body 11 a further distance M. The third region R3 extends from the distance M (i.e., a distance L+M from the forward edge 14A of the hood assembly 14) to a rearward edge 14B, as depicted in FIG. 1. The fourth R4 and fifth R5 regions, if included, further dissect the hood assembly 14 into one or more lateral segments. For example, the fourth region R4 extends inward a distance N from a right lateral edge 14C of the hood assembly 14, whereas the fifth region R5 extends inward a distance O from a left lateral edge 14D, also illustrated in FIG. 1. Notably, the dimensions shown in FIG. 1 for regions R1 through R5 are merely exemplary and provided for descriptive purposes, i.e., the length and width of the five regions R1-R5 may vary infinitely. Furthermore, a single region may be utilized or more than five regions may be employed, each having identical or differing geometric configurations, without departing from the scope of the claimed invention.

The sandwich structure 18 for each respective region R1-R5 is optimized independently of the other for impact with objects of varying dimensions and masses. To this regard, it is preferred that sandwich inner structure 18 for the first region R1 (shown in FIG. 1) have a height X (FIG. 2) of 5 mm, a wavelength Y (FIG. 2) of 60 mm, a Yield strength of at least 200 MPa, and a Young's Modulus of approximately 30

GPa. The second region R2 has a variable height X of less than 19 mm, a variable wavelength Y of less than 90 mm, a Yield strength of at least 200 MPa, and a Young's Modulus of less than 40 GPa. In addition, it is preferred that the sandwich inner structure 18 for the third region R3 (shown in FIG. 1) have a height X (FIG. 2) of 10 mm, a wavelength Y (FIG. 2) of 80 mm, a Yield strength of at least 200 MPa, and a Young's Modulus of approximately 30 GPa. In addition, the clearance C is preferably no less than 70 mm. The fourth and fifth regions R4 and R5 preferably have no sandwich inner structure 18, but rather provide a smooth transition from the regions R1-R3 wherein the upper layer 20 curves with the hood outer panel 24 at the right and left lateral edges 14C, 14D.

Still referring to FIGS. 1 and 2, the sandwich inner structure 18 is configured, as described above, to provide sufficient initial stiffness together with the hood outer panel 24 to generate a large initial deceleration as soon and high as possible upon impact with object 16, as will be more clearly understood when considered in connection with the description of FIG. 3 below. In one instance, the sandwich inner structure 18, together with an adhesive (see, e.g., glue 810, 910, 1010 of FIGS. 5A-5C, respectively), is a uniformly distributed, added mass to the hood assembly 14, i.e., the inertial effect of such added mass promoting deceleration of the object 16 in the early stages of the vehicle-object collision. The core layer 28 also serves as padding, in the form of the trapezoidal channels 32 bending and/or buckling, to absorb residual kinetic energy from the object 16 upon contact with the under-hood components (e.g., engine 35.)

The core layer 28, besides adding to the initial stiffness of the hood assembly 14 by its height H and thickness T3, is designed to trigger local rupture or failure of the lower layer 22 during the initial impact of the object 16 with the hood assembly 14. The local ruptures, triggered by the relatively strong core layer 18, can selectively and controllably reduce the local and global stiffness of the hood assembly 14, resulting in increased absorption of kinetic energy transferred from the object 16 to the hood assembly 14, thereby minimizing consumed under-hood space (e.g., reducing the necessary clearance C between the engine 35 and B-surface 29.) Failure of the lower layer 22 can be manipulated by, for example, the addition of pre-cuts or inclusions (not shown) to the lower layer 22. Furthermore, the lower layer 22 supports the sandwich structure 18 to provide the necessary bending stiffness during the initial impact between the hood assembly 14 and object 16. In other words, the hood assembly 14 is able to meet stringent performance requirements (i.e., maintain sufficient stiffness and inertia effect) with a minimal height X through the combination of the lower layer 22 with the sandwich structure 18, thereby minimizing the clearance C between the engine 35 and the lower layer B-surface 29 of the hood assembly 14.

Figure 3:
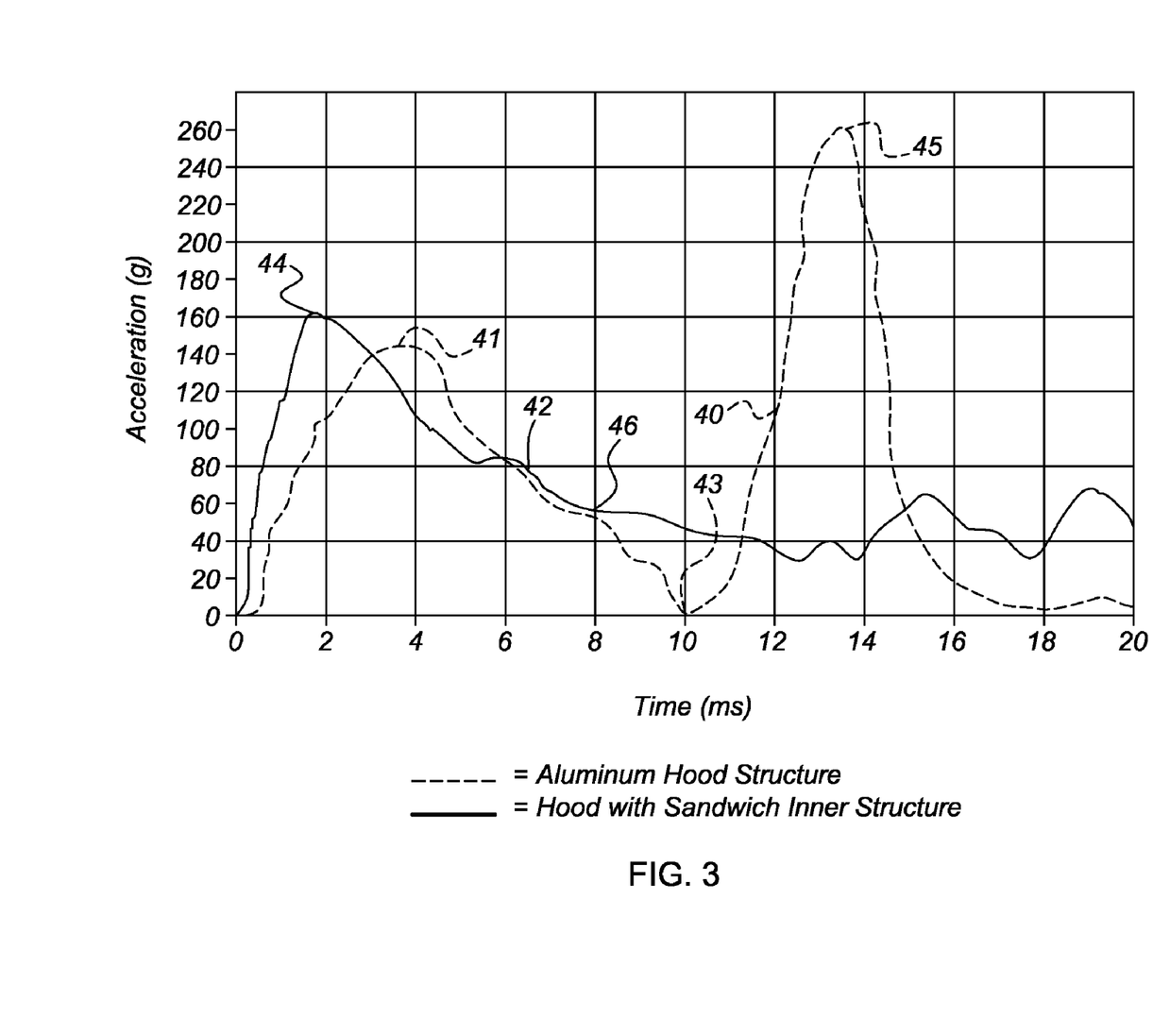
FIG. 3 is Cartesian curve or graphic illustration of a representative impact acceleration-time curve of the energy-absorbing hood assembly of FIGS. 1 and 2.

Turning to FIG. 3, a Cartesian curve is provided comparing representative impact acceleration-time curves for collisions between an object (e.g., 16 of FIGS. 1 and 2) and two different vehicle hood assemblies, wherein the acceleration (measured in units of g, where g is approximately 9.807 meters per second per second (m/s$^2$)) is arranged along the Y-axis (ordinate), and the time (measured in milliseconds (ms)) is arranged along the X-axis (abscissa.) The dashed-line curve 40 is an acceleration-time curve for a conventional reinforced aluminum hood assembly, i.e. a stamped sheet metal hood structure having conventional hat-style structural reinforcements (not shown) as described previously hereinabove. Likewise, the solid-line curve 42 is an acceleration-time curve for the hood assembly 14 of FIGS. 1 and 2.

The acceleration-time curve 40 for conventional hood assemblies has a delayed and relatively low initial ascension, peaking at approximately 135 g after almost 4 ms, i.e. point 41, and a relatively slow initial descent, bottoming at less than 10 g after 10 ms i.e., point 43, as the mass of the conventional hood assembly slows or decelerates the object 16 after a collision therebetween. A subsequent rapid acceleration and rapid deceleration then occurs—a secondary peak occurring at point 45 of curve 40, which is traditionally due to contact of the object 16 with under-hood components (e.g., engine 35 of FIG. 2.) The low first peak 41 is indicative of a high residual velocity when the object 16 subsequently makes contact with the under-hood components. The rapid second ascension to the relatively high second peak 45 indicates that the majority of kinetic energy attenuation during the collision between the object 16 and the conventional hood assembly is provided by the under-hood components. Both of these situations are not desirable.

An essential design approach is to balance the effect of the two peaks, e.g., 41 and 45, which is predominantly influenced by the hood stiffness and the available under-hood space. The ideal form of an impact acceleration-time history curve is one with a rapid initial ascension and subsequent descent. The rapid climax of the acceleration curve is indicative of a large velocity reduction of the object during the early phases of the collision with the hood assembly, requiring a relatively small consumption of the under-hood space.

Still referring to FIG. 3, the acceleration-time curve 42 has a rapid initial ascension, peaking at over 160 g in less than 2 ms, i.e., point 44, and rapid subsequent descent, reaching an equilibrium of 30-50 g in approximately 8 ms, i.e., at point 46. Notably, the curve 42 for the hood assembly 14 of FIGS. 1 and 2 maintains this steady state of acceleration throughout the remainder of the test sequence. In effect, the opposing force imparted to the object 16 by the hood assembly 14 upon a collision therebetween is relatively less variable (or more constant), provides a larger initial attenuation of kinetic energy resulting in a lower residual velocity relative to that shown in curve 40. This in turn reduces the total distance of travel required by a decelerating object 16 in order for the hood assembly 14 to fully absorb the energy from such a collision, thereby minimizing or eliminating contact between the object 16 and any under-hood components.

FIGS. 4A through 4H illustrate separate embodiments of the present invention that function similarly to the previously described vehicle hood assembly 14 of FIGS. 1 and 2, but include, among other things, variations in the configuration and orientation of the inner sandwich structure 18. For simplicity and brevity, like reference numbers are used in FIGS. 4A through 4H to refer to like components from FIGS. 1 and 2. Correspondingly, the components of FIGS. 4A-4H should be considered to be identical to a respective component of FIGS. 1 and 2 identified with a common reference number unless specified otherwise. Furthermore, the embodiments depicted in FIGS. 4A-4H, like FIGS. 1 and 2, are not to scale and are provided purely for clarification purposes; thus, the particular dimensions of the drawings presented herein are not to be considered limiting.

Figure 4A:
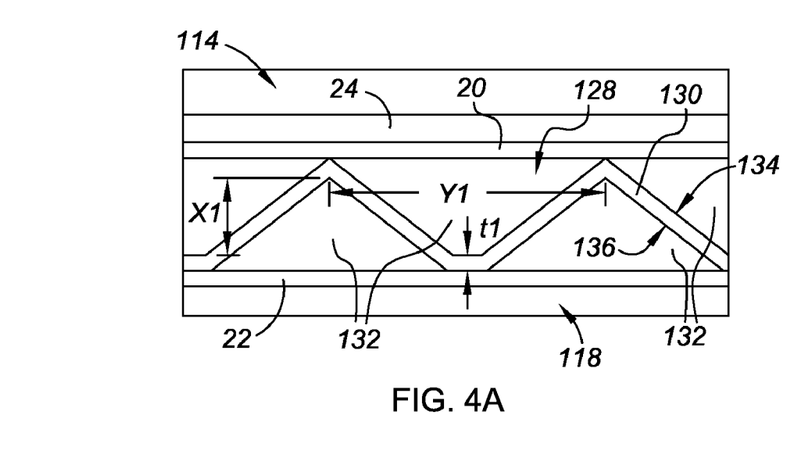
FIG. 4A is a side-schematic view of a portion of an energy-absorbing hood assembly with a sandwich inner structure according to an alternate embodiment of the present invention.

Referring now to FIG. 4A, there is shown an alternate embodiment of the present invention, illustrating an energy-absorbing vehicle hood assembly 114 having a sandwich inner structure 118 consisting primarily of an upper layer or outer skin 20, a lower layer or inner skin 22, and a rippled core layer 128 therebetween. The core layer 128 consists of a middle panel 130 having a first surface 134 substantially opposing a second surface 136, forming a plurality of channels 132, oriented laterally (i.e., orthogonally) relative to a vehicle body (e.g., 11 of FIG. 1.) Similar to the middle panel 30 of FIG. 2, the middle panel 130 of FIG. 4A is preferably a one-piece plate member of the same length and width as the upper and lower layers 20, 22, fabricated from a material known to have a suitable strength for the intended use of the hood assembly 114.

According to the embodiment of FIG. 4A, the first and second surfaces 134, 136 of the middle panel 130 define a triangular waveform profile having a thickness t1, height X1, and wavelength Y1. Functioning as described with respect to the sandwich structure 18 of FIG. 2, the characteristics of the sandwich inner structure 118 of FIG. 4A (i.e., the thickness t1, height X1, wavelength Y1, modulus, yield strength, and density) may be selected to provide a particular "tunable" and substantially constant or uniform crush performance for a given threshold crush load.

The sandwich inner structure 118, together with an adhesive (see, e.g., adhesives 812, 912, 1012 of FIGS. 5A-5C, respectively), is a uniformly distributed, added mass to the hood assembly 114, the inertial effect of such added mass thereby promoting deceleration of an object (e.g., object 16 of FIGS. 1-2) in the early stages of a collision therebetween. The core layer 128 also serves as padding, in the form of the triangular channels 132 bending and/or buckling, to absorb residual kinetic energy from the object upon contact with any under-hood components (e.g., engine 35.) The core layer 128, besides adding to the initial stiffness of the hood assembly 114 by its height X1, thickness t1 and mass, is designed to trigger local rupture or failure of the lower layer 22 during the initial impact of the hood assembly 114 with an object (e.g., object 16 of FIGS. 1-2.) The local ruptures, triggered by the relatively strong core layer 118, can selectively and controllably reduce the local and global stiffness of the hood assembly 114, resulting in increased absorption of the kinetic energy transferred from the object to the hood assembly 114, thereby minimizing consumed under-hood space (e.g., clearance C between the engine 35 and B-surface 29 shown in FIG. 2.) Furthermore, the lower layer 22 supports the sandwich structure 118 to provide the necessary bending stiffness during the initial impact between the hood assembly 114 and object. In other words, the hood assembly 114 is able to meet stringent performance requirements (i.e., maintain sufficient stiffness and inertia effect) with a minimal height X1 through the combination of the lower layer 22 with the sandwich structure 118, thereby minimizing the clearance between the hood assembly 114 and under-hood components (e.g., clearance C between the engine 35 and B-surface 29 shown in FIG. 2.)

Figure 4B:
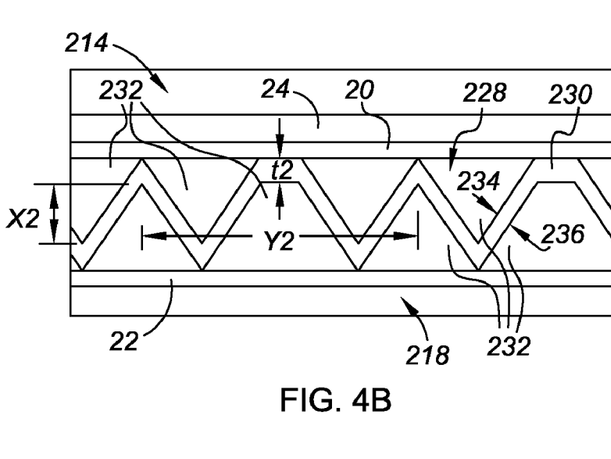
FIG. 4B is a side-schematic view of a portion of an energy-absorbing hood assembly with a sandwich inner structure according to another alternate embodiment of the present invention.

Turning now to FIG. 4B, there is shown another alternate embodiment of the present invention, illustrating an energy-absorbing vehicle hood assembly 214 having a sandwich inner structure 218 consisting primarily of an upper layer or outer skin 20, a lower layer or inner skin 22, and a rippled core layer 228 therebetween. The core layer 228 consists of a middle panel 230 having a first surface 234 substantially opposing a second surface 236, forming a plurality of channels 232, oriented laterally (i.e., orthogonally) relative to a vehicle body (e.g., 11 of FIG. 1.) Similar to the middle panel 30 of FIG. 2, the middle panel 230 of FIG. 4B is preferably a one-piece plate member of the same length and width as the upper and lower layers 20, 22, fabricated from a material known to have a suitable strength for the intended use of the hood assembly 214.

According to the embodiment of FIG. 4B, the first and second surfaces 234, 236 of the middle panel 230 of FIG. 4B define a combination triangular-trapezoidal waveform profile having a thickness t2, height X2, and wavelength Y2. Functioning as described with respect to the sandwich structure 18 of FIG. 2, the characteristics of the sandwich inner structure 218 of FIG. 4B (i.e., the thickness t2, height X2, wavelength Y2, modulus, yield strength, and density) may be selected to provide a particular "tunable" and substantially constant or uniform crush performance for a given threshold crush load.

The sandwich inner structure 218, together with an adhesive (see, e.g., adhesives 812, 912, 1012 of FIGS. 5A-5C, respectively), is a uniformly distributed, added mass to the hood assembly 214, the inertial effect of such added mass thereby promoting deceleration of an object (e.g., object 16 of FIGS. 1-2) in the early stages of a collision therebetween. The core layer 228 also serves as padding, in the form of the channels 232 bending and/or buckling, to absorb residual kinetic energy from the object upon contact with any under-hood components (e.g., engine 35.) The core layer 228, besides adding to the initial stiffness of the hood assembly 214 by its height X2, thickness t2, and mass, is designed to trigger local rupture or failure of the lower layer 22 during the initial impact of the hood assembly 214 with an object (e.g., object 16 of FIGS. 1-2.) The local ruptures, triggered by the relatively strong core layer 218, can selectively and controllably reduce the local and global stiffness of the hood assembly 214, resulting in increased absorption of the kinetic energy transferred from the object to the hood assembly 214, thereby minimizing consumed under-hood space (e.g., clearance C between the engine 35 and B-surface 29 shown in FIG. 2.) Furthermore, the lower layer 22 supports the sandwich structure 218 to provide the necessary bending stiffness during the initial impact between the hood assembly 114 and object. In other words, the hood assembly 214 is able to meet stringent performance requirements (i.e., maintain sufficient stiffness and inertia effect) with a minimal height X2 through the combination of the lower layer 22 with the sandwich structure 218, thereby minimizing the clearance between the hood assembly 214 and under-hood components (e.g., clearance C between the engine 35 and B-surface 29 shown in FIG. 2.)

Figure 4C:
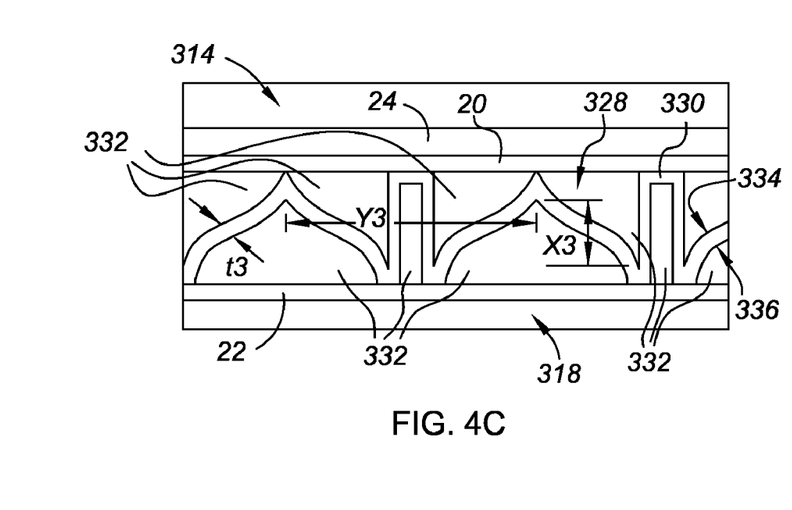
FIG. 4C is a side-schematic view of a portion of an energy-absorbing hood assembly with a sandwich inner structure according to yet another alternate embodiment of the present invention.

Looking to FIG. 4C, there is shown yet another alternate embodiment of the present invention, illustrating an energy-absorbing vehicle hood assembly 314 having a sandwich inner structure 318 consisting primarily of an upper layer or outer skin 20, a lower layer or inner skin 22, and a rippled core layer 328 therebetween. The core layer 328 consists of a middle panel 330 having a first surface 334 substantially opposing a second surface 336, forming a plurality of channels 332, oriented laterally (i.e., orthogonally) relative to a vehicle body (e.g., 11 of FIG. 1.) Similar to the middle panel 30 of FIG. 2, the middle panel 330 of FIG. 4C is preferably a one-piece plate member of the same length and width as the upper and lower layers 20, 22, fabricated from a material known to have a suitable strength for the intended use of the hood assembly 314.

According to the embodiment of FIG. 4C, the first and second surfaces 334, 336 of the middle panel 330 define a repeating half-spade profile having a thickness t3, height X3, and length Y3. Functioning as described with respect to the sandwich structure 18 of FIG. 2, the characteristics of the sandwich inner structure 318 of FIG. 4C (i.e., the thickness t3, height X3, length Y3, modulus, yield strength, and density) may be selected to provide a particular "tunable" and substantially constant or uniform crush performance for a given threshold crush load.

The hood assembly 314 is able to meet stringent performance requirements (i.e., maintain sufficient stiffness and inertia effect) with a minimal height X3 through the combination of the upper and lower layers 20, 22 with the sandwich structure 318, thereby minimizing the clearance between the hood assembly 314 and under-hood components (e.g., clearance C between the engine 35 and B-surface 29 shown in FIG. 2.) For example, the sandwich inner structure 318, together with an adhesive (see, e.g., adhesives 812, 912, 1012 of FIGS. 5A-5C, respectively), is a uniformly distributed, added mass to the hood assembly 314, the inertial effect of such added mass thereby promoting deceleration of an object (e.g., object 16 of FIGS. 1-2) in the early stages of a collision therebetween. The core layer 328 also serves as padding, in the form of the channels 332 bending and/or buckling, to absorb residual kinetic energy from the object upon contact with any under-hood components (e.g., engine 35.) The core layer 328, besides adding to the initial stiffness of the hood assembly 314 by its height X3, thickness t3, and mass, is designed to trigger local rupture or failure of the lower layer 22 during the initial impact of the hood assembly 314 with an object (e.g., object 16 of FIGS. 1-2.) The local ruptures, triggered by the relatively strong core layer 318, can selectively and controllably reduce the local and global stiffness of the hood assembly 314, resulting in increased absorption of the kinetic energy transferred from the object to the hood assembly 314, thereby minimizing consumed under-hood space (e.g., clearance C between the engine 35 and B-surface 29 shown in FIG. 2.) Furthermore, the lower layer 22 supports the sandwich structure 318 to provide the necessary bending stiffness during the initial impact between the hood assembly 314 and object.

Figure 4D:
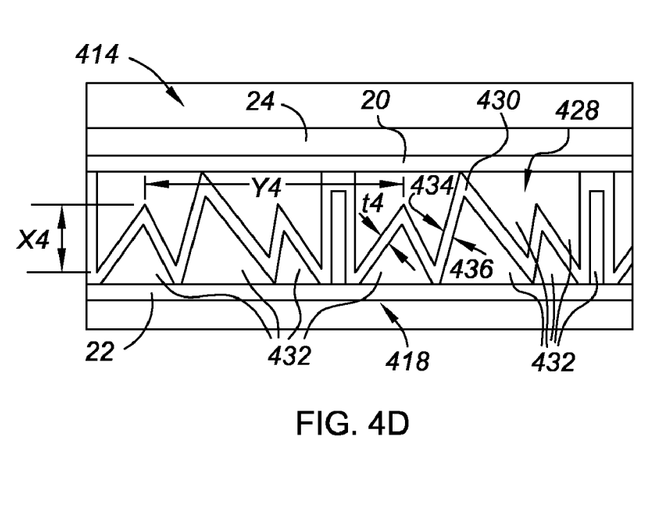
FIG. 4D is a side-schematic view of a portion of an energy-absorbing hood assembly with a sandwich inner structure according to yet another alternate embodiment of the present invention.

Referring now to FIG. 4D, there is shown yet anther alternate embodiment of the present invention, illustrating an energy-absorbing vehicle hood assembly 414 having a sandwich inner structure 418 consisting primarily of an upper layer or outer skin 20, a lower layer or inner skin 22, and a rippled core layer 428 therebetween. The core layer 428 consists of a middle panel 430 having a first surface 434 substantially opposing a second surface 436, forming a plurality of channels 432, oriented laterally (i.e., orthogonally) relative to a vehicle body (e.g., 11 of FIG. 1.) Similar to the middle panel 30 of FIG. 2, the middle panel 430 of FIG. 4D is preferably a one-piece plate member of the same length and width as the upper and lower layers 20, 22, fabricated from a material known to have a suitable strength for the intended use of the hood assembly 414.

According to the embodiment of FIG. 4D, the first and second surfaces 434, 436 of the middle panel 430 define a trifurcate profile having a thickness t4, height X4, and length Y4. Functioning as described with respect to the sandwich structure 18 of FIG. 2, the characteristics of the sandwich inner structure 418 of FIG. 4D (i.e., the thickness t4, height X4, length Y4, modulus, yield strength, and density) may be selected to provide a particular "tunable" and substantially constant or uniform crush performance for a given threshold crush load.

The sandwich inner structure 418, together with an adhesive (see, e.g., adhesives 812, 912, 1012 of FIGS. 5A-5C, respectively), is a uniformly distributed, added mass to the hood assembly 414, the inertial effect of such added mass thereby promoting deceleration of an object (e.g., object 16 of FIGS. 1-2) in the early stages of a collision therebetween. The core layer 428 also serves as padding, in the form of the channels 432 bending and/or buckling, to absorb residual kinetic energy from the object upon contact with any under-hood components (e.g., engine 35.) The core layer 428, besides adding to the initial stiffness of the hood assembly 414 by its height X4, thickness t4, and mass, is designed to trigger local rupture or failure of the lower layer 22 during the initial impact of the hood assembly 414 with an object (e.g., object 16 of FIGS. 1-2.) The local ruptures, triggered by the relatively strong core layer 418, can selectively and controllably reduce the local and global stiffness of the hood assembly 414, resulting in increased absorption of the kinetic energy transferred from the object to the hood assembly 414, thereby minimizing consumed under-hood space (e.g., clearance C between the engine 35 and B-surface 29 shown in FIG. 2.) Furthermore, the lower layer 22 supports the sandwich structure 418 to provide the necessary bending stiffness during the initial impact between the hood assembly 114 and object. In other words, the hood assembly 414 is able to meet stringent performance requirements (i.e., maintain sufficient stiffness and inertia effect) with a minimal height X4 through the combination of the lower layer 22 with the sandwich structure 418, thereby minimizing the clearance between the hood assembly 414 and under-hood components (e.g., clearance C between the engine 35 and B-surface 29 shown in FIG. 2.)

Figure 4E:
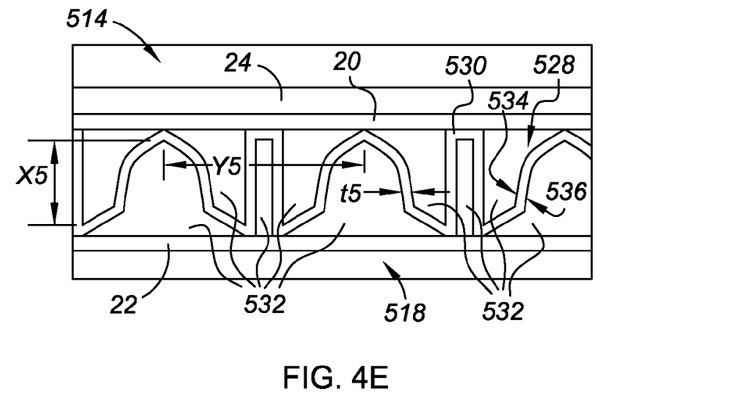
FIG. 4E is a side-schematic view of a portion of an energy-absorbing hood assembly with a sandwich inner structure according to yet another alternate embodiment of the present invention.

FIG. 4E of the drawings shows yet another alternate embodiment of the present invention, illustrating an energy-absorbing vehicle hood assembly 514 having a sandwich inner structure 518 consisting primarily of an upper layer or outer skin 20, a lower layer or inner skin 22, and a rippled core layer 528 therebetween. The core layer 528 consists of a middle panel 530 having a first surface 534 substantially opposing a second surface 536, forming a plurality of channels 532, oriented laterally (i.e., orthogonally) relative to a vehicle body (e.g., 11 of FIG. 1.) Similar to the middle panel 30 of FIG. 2, the middle panel 530 of FIG. 4E is preferably a one-piece plate member of the same length and width as the upper and lower layers 20, 22, fabricated from a material known to have a suitable strength for the intended use of the hood assembly 514.

According to the embodiment of FIG. 4E, the first and second surfaces 534, 536 of the middle panel 530 define a dome-like profile having a thickness t5, height X5, and length Y5. Functioning as described with respect to the sandwich structure 18 of FIG. 2, the characteristics of the sandwich inner structure 518 of FIG. 4E (i.e., the thickness t5, height X5, wavelength Y5, modulus, yield strength, and density) may be selected to provide a particular "tunable" and substantially constant or uniform crush performance for a given threshold crush load.

The sandwich inner structure 518, together with an adhesive (see, e.g., adhesives 812, 912, 1012 of FIGS. 5A-5C, respectively), is a uniformly distributed, added mass to the hood assembly 514, the inertial effect of such added mass thereby promoting deceleration of an object (e.g., object 16 of FIGS. 1-2) in the early stages of a collision therebetween. The core layer 528 also serves as padding, in the form of the channels 532 bending and/or buckling, to absorb residual kinetic energy from the object upon contact with any under-hood components (e.g., engine 35.) The core layer 528, besides adding to the initial stiffness of the hood assembly 514 by its height X5, thickness t5, and mass, is designed to trigger local rupture or failure of the lower layer 22 during the initial impact of the hood assembly 514 with an object (e.g., object 16 of FIGS. 1-2.) The local ruptures, triggered by the relatively strong core layer 518, can selectively and controllably reduce the local and global stiffness of the hood assembly 514, resulting in increased absorption of the kinetic energy transferred from the object to the hood assembly 514, thereby minimizing consumed under-hood space (e.g., clearance C between the engine 35 and B-surface 29 shown in FIG. 2.) Furthermore, the lower layer 22 supports the sandwich structure 518 to provide the necessary bending stiffness during the initial impact between the hood assembly 514 and object. In other words, the hood assembly 514 is able to meet stringent performance requirements (i.e., maintain sufficient stiffness and inertia effect) with a minimal height X5 through the combination of the lower layer 22 with the sandwich structure 518, thereby minimizing the clearance between the hood assembly 514 and under-hood components (e.g., clearance C between the engine 35 and B-surface 29 shown in FIG. 2.)

Figure 4F:
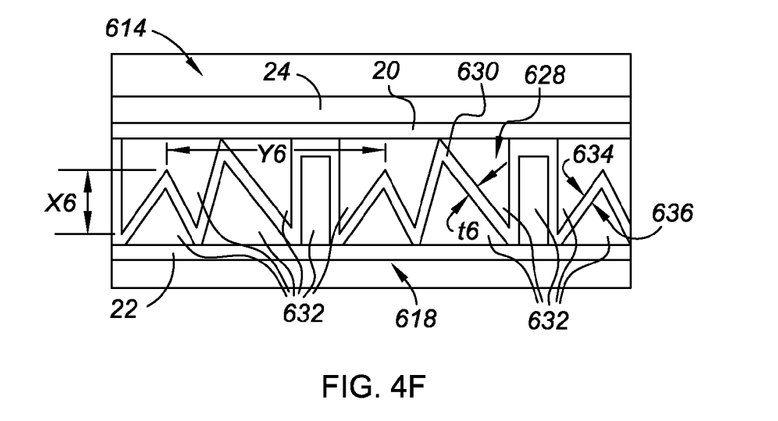
FIG. 4F is a side-schematic view of a portion of an energy-absorbing hood assembly with a sandwich inner structure according to yet another alternate embodiment of the present invention.

Referring now to FIG. 4F, there is shown an alternate embodiment of the present invention, illustrating an energy-absorbing vehicle hood assembly 614 having a sandwich inner structure 618 consisting primarily of an upper layer or outer skin 20, a lower layer or inner skin 22, and a rippled core layer 628 therebetween. The core layer 628 consists of a middle panel 630 having a first surface 634 substantially opposing a second surface 636, forming a plurality of channels 632, oriented laterally (i.e., orthogonally) relative to a vehicle body (e.g., 11 of FIG. 1.) Similar to the middle panel 30 of FIG. 2, the middle panel 630 of FIG. 4F is preferably a one-piece plate member of the same length and width as the upper and lower layers 20, 22, fabricated from a material known to have a suitable strength for the intended use of the hood assembly 614.

According to the embodiment of FIG. 4F, the first and second surfaces 634, 636 of the middle panel 630 define a bifurcate profile having a thickness t6, height X6, and length Y6. Functioning as described with respect to the sandwich structure 18 of FIG. 2, the characteristics of the sandwich inner structure 618 of FIG. 4F (i.e., the thickness t6, height X6, wavelength Y6, modulus, yield strength, and density) may be selected to provide a particular "tunable" and substantially constant or uniform crush performance for a given threshold crush load.

The sandwich inner structure 618, together with an adhesive (see, e.g., adhesives 812, 912, 1012 of FIGS. 5A-5C, respectively), is a uniformly distributed, added mass to the hood assembly 614, the inertial effect of such added mass thereby promoting deceleration of an object (e.g., object 16 of FIGS. 1-2) in the early stages of a collision therebetween. The core layer 628 also serves as padding, in the form of the channels 632 bending and/or buckling, to absorb residual kinetic energy from the object upon contact with any under-hood components (e.g., engine 35.) The core layer 628, besides adding to the initial stiffness of the hood assembly 614 by its height X6, thickness t6, and mass, is designed to trigger local rupture or failure of the lower layer 22 during the initial impact of the hood assembly 614 with an object (e.g., object 16 of FIGS. 1-2.) The local ruptures, triggered by the relatively strong core layer 618, can selectively and controllably reduce the local and global stiffness of the hood assembly 614, resulting in increased absorption of the kinetic energy transferred from the object to the hood assembly 614, thereby minimizing consumed under-hood space (e.g., clearance C between the engine 35 and B-surface 29 shown in FIG. 2.) Furthermore, the lower layer 22 supports the sandwich structure 618 to provide the necessary bending stiffness during the initial impact between the hood assembly 614 and object. In other words, the hood assembly 614 is able to meet stringent performance requirements (i.e., maintain sufficient stiffness and inertia effect) with a minimal height X6 through the combination of the lower layer 22 with the sandwich structure 618, thereby minimizing the clearance between the hood assembly 614 and under-hood components (e.g., clearance C between the engine 35 and B-surface 29 shown in FIG. 2.)

Figure 4G:
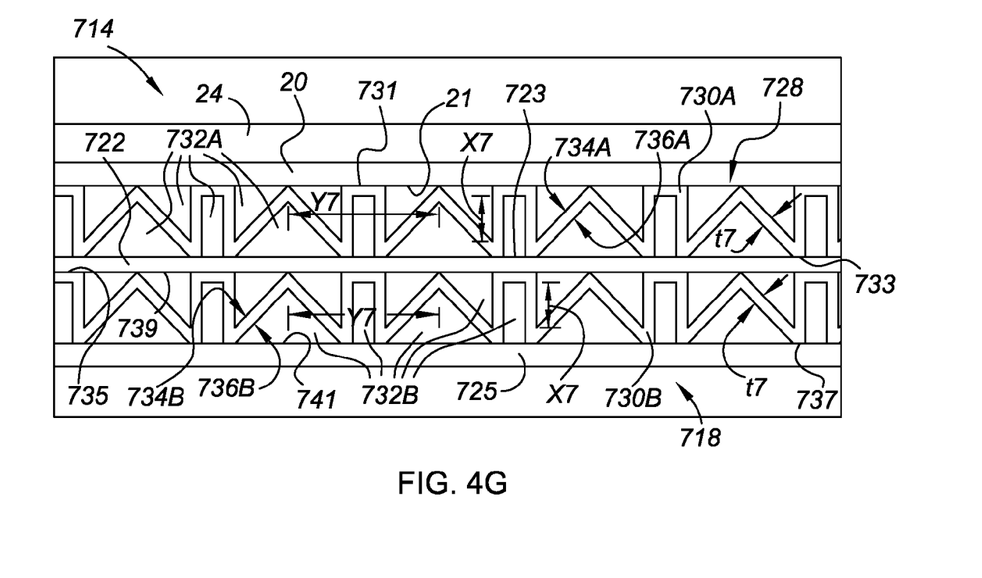
FIG. 4G is a side-schematic view of a portion of an energy-absorbing hood assembly with a sandwich inner structure according to yet another alternate embodiment of the present invention.

Referring now to FIG. 4G, there is shown an additional alternate embodiment of the present invention, illustrating an energy-absorbing vehicle hood assembly 714 having a multi-layer composite sandwich inner structure 718 consisting primarily of an upper layer or outer skin 20, first and second lower layers or inner skins 722, 725, respectively, and a rippled core layer 728 therebetween. The core layer 728 consists primarily of first and second middle panels 730A and 730B each having a first surface 734A, 734B, respectively, substantially opposing a second surface 736A, 736B. Similar to the middle panel 30 of FIG. 2, the first and second middle panels 730A and 730B of FIG. 4G are preferably each one-piece plate members of the same length and width as the upper and lower layers 20, 722, 725, fabricated from a material known to have a suitable strength for the intended use of the hood assembly 714.

The first and second surfaces 734A, 736A of the first middle panel 730A define a corrugated profile having a plurality of first and second bonding surfaces 731 and 733, respectively. In a similar regard, the first and second surfaces 734B, 736B of the second middle panel 730B define a corrugated profile having a plurality of third and fourth bonding surfaces 735 and 737, respectively. The first middle panel 730A is secured via the first bonding surface 731 to a first interface surface 21 of the upper layer 20 and via the second bonding surface 733 to a second interface surface 723 of the first lower layer 722, thereby forming a first plurality of laterally oriented channels 732A. In addition, the second middle panel 730B is secured via the third bonding surface 735 to a third interface surface 739 of the first lower layer 722, and via the fourth bonding surface 737 to a fourth interface surface 741 of the second lower layer 725, thereby forming a second plurality of laterally oriented channels 732B.

According to the embodiment of FIG. 4G, the first 734A, 734B and second surfaces 736A, 736B of the first and second middle panels 730A, 730B define a triangular profile having common thicknesses t7, height X7, and length Y7. Functioning as described with respect to the sandwich structure 18 of FIG. 2, the characteristics of the sandwich inner structure 718 of FIG. 4G (i.e., the thickness t7, height X7, length Y7, modulus, yield strength, and density) may be selected to provide a particular "tunable" and substantially constant or uniform crush performance for a given threshold crush load. Also within the scope of the present invention, the profiles of the first and second middle panels 730A, 730B may define other similar or divergent profiles (e.g., one or a combination of those profiles depicted in FIGS. 1-4F) having identical or different characteristics.

The hood assembly 714 is able to meet stringent performance requirements (i.e., maintain sufficient stiffness and inertia effect) with a minimal total height (i.e., X7+X7) through the combination of the upper and lower layers 20, 722, 725 with the sandwich structure 718, thereby minimizing the necessary clearance between the hood assembly 714 and under-hood components (e.g., clearance C between the engine 35 and B-surface 29 shown in FIG. 2.) For example, the sandwich inner structure 718, together with an adhesive (see, e.g., adhesives 812, 912, 1012 of FIGS. 5A-5C, respectively), is a uniformly distributed, added mass to the hood assembly 714, the inertial effect of such added mass thereby promoting deceleration of an object (e.g., object 16 of FIGS. 1-2) in the early stages of a collision therebetween. In addition, the core layer 728 serves as padding, in the form of the channels 732A and 732B bending and/or buckling, to absorb residual kinetic energy from the object upon contact with any under-hood components (e.g., engine 35.) The core layer 728, besides adding to the initial stiffness of the hood assembly 714 by the combined heights X7, thickness T7, and mass of the first and second middle panels 730A and 730B, is also designed to trigger local rupture or failure of the lower layers 722, 725 during the initial impact of the hood assembly 714 with an object (e.g., object 16 of FIGS. 1-2.) The local ruptures, triggered by the relatively strong core layer 718, can selectively and controllably reduce the local and global stiffness of the hood assembly 714, resulting in increased absorption of the kinetic energy transferred from the object to the hood assembly 714, thereby minimizing consumed underhood space (e.g., clearance C between the engine 35 and B-surface 29 shown in FIG. 2.) Furthermore, the lower layers 722, 725 supports the sandwich structure 718 to provide the necessary bending stiffness during initial impact between the hood assembly 714 and object.

Figure 5A:
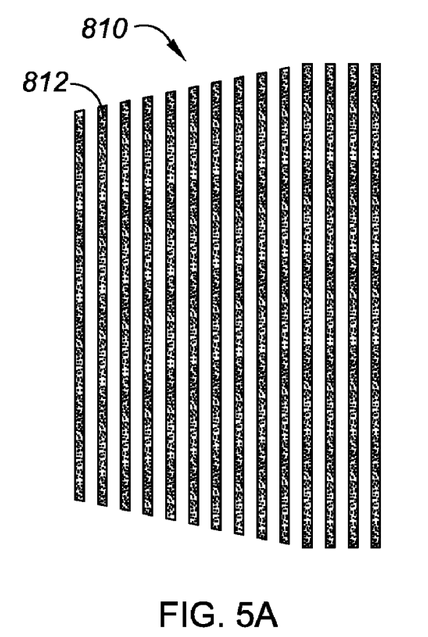
FIG. 5A is a schematic, plan view of an adhesive distribution for an energy-absorbing hood assembly with a sandwich inner structure according to the present invention.
Figure 5B:
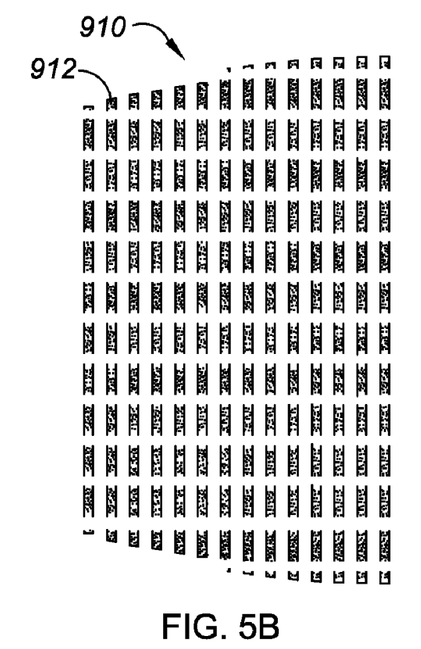
FIG. 5B is a schematic, plan view of an alternate adhesive distribution for an energy-absorbing hood assembly with a sandwich inner structure according to the present invention.
Figure 5C:
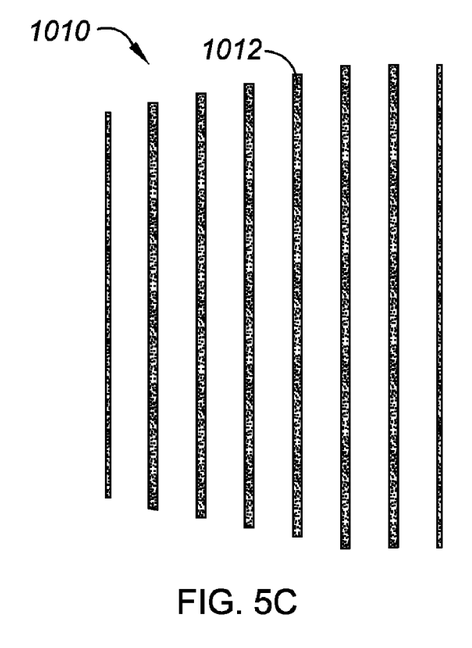
FIG. 5C is a schematic, plan view of another alternate adhesive distribution for an energy-absorbing hood assembly with a sandwich inner structure according to the present invention.

Three adhesive arrangements, i.e., first, second, and third glue distributions 810, 910, and 1010, respectively, are each respectively depicted schematically from a plan view in FIGS. 5A-5C of the drawings. More specifically, FIG. 5A depicts the first glue distribution 810 of adhesive 812 as it would be arranged so as to adhere the various sandwich inner structures disclosed herein to their corresponding hood outer panel 24. By way of example, the adhesive 812 may be arranged along the first bonding surface 31 of the middle panel 30, FIG. 2, according to the first glue distribution 810 of FIG. 5A to fixedly attach the middle panel 30 to the first interface surface 21 of the upper layer 20 of FIG. 2. Alternatively, in instances where the upper layer 20 and hood outer panel 24, FIG. 2, are one in the same, the adhesive 812 may be arranged along the first bonding surface 31 of the middle panel 30 of FIG. 2 according to the first glue distribution 810 of FIG. 5A to fixedly attach the middle panel 30 to the inner surface 17 of the hood outer panel 24. In a similar regard, the adhesive 812 can also be arranged along the second bonding surface 33 of the middle panel 30 of FIG. 2 according to the first glue distribution 810 of FIG. 5A to fixedly attach the middle panel 30 to the second interface surface 23 of the lower layer 22.

Incorporated as described with respect to the first glue distribution 810 of FIG. 5A, the second and third glue distributions 910 and 1010 of adhesives 912 and 1012, respectively, are shown schematically in FIGS. 5B and 5C as they would be arranged so as to adhere the various sandwich inner structures disclosed herein to the hood outer panel 24. The adhesives 812, 912, and 1012 of FIGS. 5A-5C should each be one of sufficient bonding strength, durability, and resilience for the intended application of the energy-absorbing vehicle hood assembly (e.g., hood assemblies 14, 114, 214, 314, 414, 514, 614, 714 respectively depicted in FIGS. 2-4G), such as silicone and acrylic based elastomeric adhesives, polymeric adhesives, and epoxy adhesives.

While the best modes for carrying out the invention have been described in detail, those familiar with the art to which this invention relates will recognize various alternative designs and embodiments for practicing the invention within the scope of the appended claims.

The invention claimed is:

1. A hood assembly for use with a vehicle, comprising:
   an upper layer having a first interface surface;
   a first lower layer having a second interface surface;
   a first middle panel having substantially opposing first and second surfaces defining a first corrugated profile having a first and a second plurality of bonding surfaces;
   wherein said first plurality of bonding surfaces is operatively attached to said first interface surface and said second plurality of bonding surfaces is operatively attached to said second interface surface to thereby define a first plurality of channels oriented laterally with respect to said vehicle;
   wherein said first corrugated profile defines a first height and a first wavelength along a first region of the hood assembly, said first height and wavelength each being configured to provide a first predetermined level of absorption and attenuation of kinetic energy imparted to the hood assembly by objects upon impact therebetween; and
   wherein said first corrugated profile further defines a second height and a second wavelength along a second region of the hood assembly, said second height and wavelength each being configured to provide a second predetermined level of absorption and attenuation of kinetic energy imparted to the hood assembly by objects upon impact therebetween.

2. The hood assembly of claim 1, wherein said first corrugated profile further defines a variable height and a variable wavelength along a third region of the hood assembly, said variable height and wavelength configured to provide varying levels of absorption and attenuation of kinetic energy imparted to the hood assembly by objects upon impact therebetween throughout said third region; and
   wherein said third region is located rearward of said first region and forward of said second region.

3. The hood assembly of claim 1, further comprising:
   a hood outer panel having an inner surface, wherein said upper layer is operatively secured to said inner surface of said hood outer panel.

4. The hood assembly of claim 1, wherein said upper layer, first lower layer and first middle panel are each made from one of a metallic material and a brittle plastic.

5. The hood assembly of claim 1, wherein said upper layer, first lower layer and first middle panel are each made from a metallic material.

6. The hood assembly of claim 1, wherein said upper layer, first lower layer and first middle panel are each made from a brittle plastic.

7. The hood assembly of claim 1, wherein said first wavelength is approximately 40 to 165 millimeters.

8. The hood assembly of claim 1, wherein said first height is approximately 5 to 20 millimeters.

9. The hood assembly of claim 1, wherein said first height is 5 mm, said second height is 10 mm, said first wavelength is 60 mm, and second wavelength is 80 mm.

10. The hood assembly of claim 1, wherein said first corrugated profile is a trapezoidal waveform profile.

11. The hood assembly of claim 1, wherein said first corrugated profile is a triangular waveform profile.

12. The hood assembly of claim 1, wherein said first corrugated profile is a combination trapezoidal-triangular waveform profile.

13. The hood assembly of claim 1, wherein said first corrugated profile is a repeating half-spade profile.

14. The hood assembly of claim 1, wherein said first corrugated profile is a bifurcate profile.

15. The hood assembly of claim 1, wherein said first corrugated profile is a trifurcate profile.

16. The hood assembly of claim 1, wherein said first lower layer further includes a third interface surface substantially opposing said second interface surface, said hood assembly further comprising:
   a second lower layer having a fourth interface surface; and
   a second middle panel having substantially opposing first and second surfaces defining a second corrugated profile having a third and a fourth plurality of bonding surfaces;
   wherein said third plurality of bonding surfaces is fixedly attached to said third interface surface and said fourth plurality of bonding surfaces is fixedly attached to said fourth interface surface to thereby define a second plurality of channels oriented laterally with respect to said vehicle.

17. A vehicle having a vehicle body defining a front compartment, the vehicle comprising:
a hood assembly configured to extend over and above the front compartment of the vehicle, said hood assembly including:
an upper layer having a first interface surface;
a lower layer having a second interface surface; and
a middle panel having substantially opposing first and second surfaces defining a corrugated profile having a first and a second plurality of bonding surfaces;
wherein said first plurality of bonding surfaces is operatively attached to said first interface surface and said second plurality of bonding surfaces is operatively attached to said second interface surface to thereby define a plurality of channels oriented laterally with respect to said vehicle;
wherein said corrugated profile defines a first height and a first wavelength along a first region of said hood assembly, said first height and wavelength each being configured to provide a first predetermined level of absorption and attenuation of kinetic energy imparted to said hood assembly by objects upon impact therebetween; and
wherein said corrugated profile further defines a second height and a second wavelength along a second region of said hood assembly different from said first region, said second height and wavelength each being configured to provide a second predetermined level of absorption and attenuation of kinetic energy imparted to said hood assembly by objects upon impact therebetween.

18. The vehicle of claim 17, wherein said first and second wavelengths are approximately 40 to 165 millimeters.

19. The vehicle of claim 17, wherein said first and second heights are approximately 5 to 20 millimeters.

20. The vehicle of claim 17, wherein said first height is 5 mm, said second height is 10 mm, said first wavelength is 60 mm, and second wavelength is 80 mm.

21. The vehicle of claim 17, wherein said corrugated profile is a trapezoidal waveform profile.

22. The vehicle of claim 21, further comprising:
a hood outer panel having an inner surface, wherein said upper layer is operatively secured to said inner surface of said hood outer panel.

23. The vehicle of claim 22, wherein said upper layer, lower layer and middle panel are each made from one of a metallic material and a brittle plastic.

24. The vehicle of claim 22, wherein said upper layer, lower layer and middle panel are each made from a brittle plastic.

25. The vehicle of claim 22, wherein said upper layer, lower layer and middle panel are each made from a metallic material.

26. The vehicle of claim 22, wherein said corrugated profile further defines a variable height and a variable wavelength along a third region of said hood assembly, said variable height and wavelength configured to provide varying levels of absorption and attenuation of kinetic energy imparted to said hood assembly by objects upon impact therebetween throughout said third region; and
wherein said third region is located rearward of said first region and forward of said second region.

27. A hood assembly for use with a vehicle, comprising:
an upper layer having a first interface surface;
a lower layer having a second interface surface;
a middle panel having substantially opposing first and second surfaces defining a trapezoidal waveform profile having a first and a second plurality of bonding surfaces; and
a hood outer panel having an inner surface, wherein said upper layer is operatively secured to said inner surface of said hood outer panel;
wherein said first plurality of bonding surfaces is operatively attached to said first interface surface to thereby define a first plurality of channels oriented laterally with respect to said vehicle;
wherein said second plurality of bonding surfaces is operatively attached to said second interface surface to thereby define a second plurality of channels oriented laterally with respect to said vehicle;
wherein said trapezoidal profile defines a first height and a first wavelength along a first region of the hood assembly, said first height and wavelength each being configured to provide a first predetermined level of absorption and attenuation of kinetic energy imparted to the hood assembly by objects upon impact therebetween; and
wherein said trapezoidal profile further defines a second height and a second wavelength along a second region of the hood assembly different from said first region, said second height and wavelength each being configured to provide a second predetermined level of absorption and attenuation of kinetic energy imparted to the hood assembly by objects upon impact therebetween.

28. The hood assembly of claim 27, wherein said trapezoidal profile further defines a variable height and a variable wavelength along a third region of the hood assembly, said variable height and wavelength configured to provide varying levels of absorption and attenuation of kinetic energy imparted to the hood assembly by objects upon impact therebetween throughout said third region; and
wherein said third region is located rearward of said first region and forward of said second region.

29. The hood assembly of claim 28, wherein said first, second, and third wavelengths are each approximately 40 to 165 millimeters.

30. The hood assembly of claim 29, wherein said first, second, and third heights are each approximately 5 to 20 millimeters.

31. The hood assembly of claim 30, wherein said hood outer panel and said upper layer are a single unitary member.

32. The hood assembly of claim 31, wherein said upper layer, lower layer, and middle panel are each made from one of a metallic material and a brittle plastic.

* * * * *